Patented Oct. 21, 1947

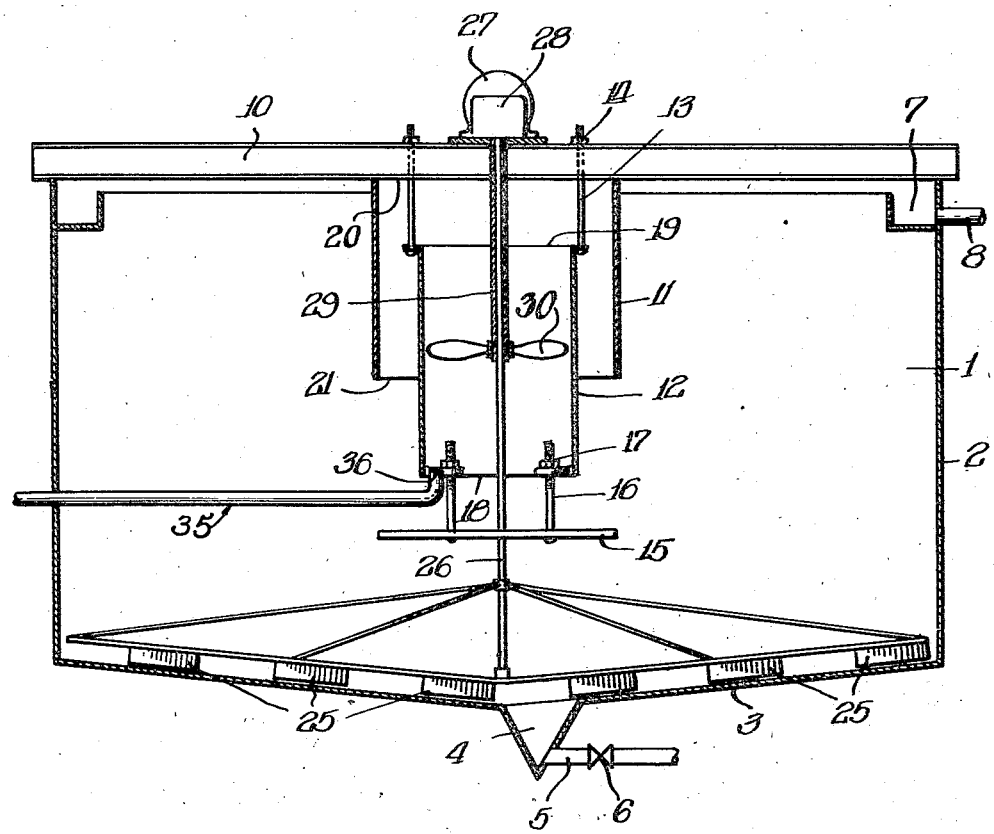

2,429,316

UNITED STATES PATENT OFFICE 2,429,316

PROCESS AND APPARATUS FOR IMPROVING CLARIFICATION OF TURBID LIQUIDS BY USE OF PARTIALLY THICKENED SLUDGE

Walter H. Green, Batavia, Ill., assignor to Infilco Incorporated, Chicago, Ill., a corporation of Delaware Application October 26, 1942, Serial No. 463,433

12 Claims. (Cl. 210—3)

This invention has to do with the treatment of liquids to clarify them and particularly with the clarification of liquids carrying putrescible matter such as sewage.

One of the objects of the invention is to provide an improved apparatus and process for the treatment of liquids containing suspended solids and colloidal matter, such as sewage and other waste liquors.

Another of the objects of this invention is to provide an improved method and apparatus for clarifying raw sewage, i. e., separating sewage solids from the sewage liquid.

Another object of this invention is to provide a novel process and apparatus for the conditioning of solids, particularly those of a light and fragile type such as sewage solids, for rapid and complete sedimentation, and the subsequent separation of such conditioned solids in the form of a relatively dense sludge, in a unitary apparatus and process.

The process and apparatus will be described in connection with the clarification of sewage for purposes of illustration, but it should not be construed as limited thereto as it will be obvious that the process can be applied to other liquids containing suspended solids with equal facility and benefit.

Raw sewage entering a plant for treatment may pass through a screen to remove coarse particles and rather rapidly through a grit chamber to remove heavier mineral particles that will settle quickly but without permitting the sedimentation of the light and easily putrescible sewage solids. Customarily the first step of actual sewage purification will be to pass raw sewage through a large sedimentation chamber, or clarifier, for the deposit of as much of the putrescible solid matter as may be possible. For reasons that will be referred to later, such clarifiers are ordinarily made of a size to hold the sewage for a period of about one and one-half to two hours based upon the average rate of flow. The sewage flow through such apparatus is ordinarily continuous although varying in amount at different times, as at different hours of the day. Following such clarifying the sewage is ordinarily passed into a subsequent purification step for the further removal of organic matter, such step being usually a biological one.

The size of the clarifier is determined by a compromise between various things. It is, of course, desirable to deposit as much as possible of the solids in this clarifier and thereby to relieve the load on the subsequent steps, and this could be accomplished to some extent by making the clarifier larger. If this is done the cost of the clarifier will be greater, which is undesirable, but more important, the sewage cannot advantageously be retained too long in this clarifying step without putrefaction beginning, with undesirable results in several directions. It is desirable rather to reduce the size of the basin and one of the objects of this invention is directed to this end.

A large part of the solids carried in sewage are light and do not settle readily, so that on the average and with basins designed for one and one-half to two hour detention of sewage, only 50 or 60 per cent of the solids will be deposited. Even the solids that are deposited are mostly quite light, and form a thin sludge. In such apparatus the water content of the sludge is generally up around 97 or 98 per cent, and sludge containing as little as 95 per cent water has perhaps been obtained in a few cases. This sludge must be disposed of some way and the most common way is to subject it to a digestion process in what is known as a digester tank. The size of the digester is determined not so much by the quantity of solids to be digested as by the quantity of the liquid carrying solids that it must receive from the clarifier, and consequently it is desirable to get as thick a sludge as possible from the clarifier. Every advance in this direction permits a correspondingly smaller and less costly digester apparatus. If, instead of sending the sludge from a clarifier to the digester for disposal, it is disposed of in some other way, as by being filtered or discharged into a lagoon, it is still desirable to have the water content as small as may be. One of the objects that I have in mind is to increase the density or reduce the water content of the clarifier sludge both by increasing the density of the individual particles forming the sludge and by putting these particles into a form so that they will compact more readily.

These, and other, objects will be readily apparent from the specification and claims which follow.

Many attempts have heretofore been made to increase the amount or proportion of solids removed from sewage in the preliminary clarifier and some of these have had the effect of increasing the density of the sludge, although this may be in part due to the addition of other and heavier solid matter. For example, it is well known that if the sewage is treated with certain chemicals, such as iron salts, or lime, a coagulating effect may be obtained by which particles in the sewage are aggregated and weighted so that advantage can be gained in the way of greater removal, greater rapidity of settling, and a denser sludge. The disadvantage of such chemical treatment is the cost of the chemicals, which is considerable if the amount is used that is required to get even approximately the full benefits possible, and this additional cost may exceed the cost of the larger clarifier and digester that might otherwise be required. Chemicals have another disadvantage in that they may have some tendency to stabilize the organic matter so that it does not so rapidly begin to digest or digestion may proceed more slowly. I have in mind to use a suitable chemical in my process when it may prove advantageous to do so. However, in most instances the amount of chemical required can be considerably reduced by my process.

The well known process of "flocculation" has been applied to raw sewage to improve sedimentation, both with and without the addition of chemicals, and, either with or without chemicals, such flocculation has advantageous effect in the intended direction, but here also there are disadvantages. The flocculation process is based upon the idea of retaining the liquid for a period within some sort of tank or basin and there subjecting it to a mild degree of agitation so as to cause collision, or promote contact, between particles, because on such contact some of the particles will adhere to each other and thus build up into larger and more settleable particles. Because the flocs so formed are quite fragile, and also to permit the original adherence of the particles, all motion both of the liquid and of the agitating apparatus in the flocculation zone must be very slow as with paddle speeds of more than about one and one-half to two feet per second the result is apt to be destructive rather than beneficial. Because of this slow motion there are not many collisions obtained in a given space or time, and the flocculation basin has to be rather large for material benefit to be obtained. If the time of retention in the flocculating space is made such as to obtain a reasonably full measure of the benefits that are possible by flocculation, then the flocculation basin tends to become undesirably large. Even though the clarifier may be somewhat reduced in size, the time of retention in the flocculation basin, plus that in the clarifier, is about the same as would be required for a clarifier without the preliminary flocculation. It has been proposed to combine the flocculation basins with the clarifier itself in various ways, such as using a part of the space within the clarifier as flocculating space. This has advantages in the way of reducing cost of construction somewhat but does not improve the flocculation results nor the time required to obtain them, and has the disadvantage that the volume occupied by the flocculator, which is desirably very substantial, is subtracted from the volume available for clarification, so that the volume of the combined apparatus must be increased in size accordingly, and will tend to be of the same, or greater, dimensions than if the flocculator were omitted.

It is well known in the treatment of liquids to return to liquid entering to be treated a portion of the solids or sludge that have settled from previously treated liquid, such returned solids having a beneficial action in that they tend to weight and enclose newly entering solids and drag the new solids down more rapidly on being allowed to resettle. The solids for this purpose generally have been drawn by a pump, or similar means, from a sludge pocket, into which they were scraped after settling on the floor of a sedimentation basin, or the settling basin might have a sloping floor down which the sludge would flow as it deposits to a pickup point. Such sludge return processes have a beneficial effect in many cases but in other cases the results have been to so break up the returned sludge that it would not again settle readily and the effluent liquid from the clarifier has been in some such cases more turbid with the sludge return than without. According to my observation, this result is partly due to the breaking down effect previously spoken of and partly because the sludge brought back is not that which is most desirable for the intended purpose. I have reason to believe that there is always some destructive action in handling and returning sludge in any such way, even though great care be exercised in the handling, and that this effect is cumulative so that while sludge may perhaps be returned a certain number of times without serious damage, yet ultimately the effect will become decidedly objectionable.

I am proposing to use what might from one aspect be spoken of as a sludge return, but I am proposing to do this in a way that is advantageous and that so far as I am aware has never before been proposed. I propose to use what may well be spoken of as a selective effect as to the sludge or solids that I bring back for reuse, and what may be called a cyclic selective circulation of sludge in or through a zone through which entering solids must pass and in which they are gradually changed from a relatively lighter to a relatively denser condition or sludge. I am aware that selective action in sludge return has heretofore been proposed but not in the way that I find advantageous and am proposing. Heretofore selective action has been had by allowing the solids to deposit in different zones in some way, whereby there would be obtained a classification effect and the heavier or lighter solids as might be desirable taken from the place of deposit back into a treatment zone. Whatever advantage may be so gained, such methods are open to the objection previously spoken of that in the process of being deposited and picked up some damage results. I propose to use solids that, while they have thickened to some extent, are still in a state of suspension or semi-suspension in the liquid and so have not been subjected to any damage that may come from too much thickening or depositing, and which may be brought back for reuse by ordinary means without damage to them. In my process, I use what may well be called "partially thickened sludge" in contrast to the return of "thickened sludge" of the prior art. By this means I can bring back the required amount of solids without damage to them, and I secure an additional advantageous effect. By selecting the sludge or solids in the way I propose I can bring back solids that are of advantageous nature with respect to gathering up the newly entering solids because their surfaces are more closely akin, so that on contact adherence is more likely to occur. Furthermore, I am able to bring back a very large quantity of solids so that a very large amount of surface will be presented thereby and the new solids become, so to speak, absorbed by or incorporated in the volume of older solids as these are distributed through the new liquid. Consequently, it is not necessary to have the large flocculating chamber that is necessary with the prior art, nor is it necessary to have the agitation that is characteristic of the flocculating process, it being sufficient to do no more than to provide for the mingling of newly entering liquid containing the new solids and the liquid bringing back the older solids so that contact is obtained. This has the advantageous effect of reducing both the amount of space required and also of reducing the size of the mixing mechanism almost to the point of elimination, so that I am able to put my mingling apparatus and chamber within the clarifier without taking any appreciable volume from the latter.

I have observed that by such method or procedure not only can the solids in the newly entering sewage be entrapped or incorporated in the older sludge, but there is a beneficial action on the sludge so used. It is known that sludge after or upon settling can be caused to thicken by stirring, and I have found that a thickening action upon the sludge can be had, or occurs in carrying out my process, prior to the actual sedimentation of the sludge. Thickening processes may be the result of either or both of two things. One is the escape of water that is held between particles so that they can come closer together and the whole bed in this way becomes more compact. Thickening can also be had by means that will cause or aid the escape of liquid from within the boundaries of the particles themselves, which shrink as to size and become more dense. Apparently something of this latter kind occurs upon the continued circulation of what has above been spoken of as partially thickened sludge, but that may be something between a sludge and a true suspension, the material used being of the nature of what is sometimes spoken of as a semi-suspension or a quaking suspension. So far as these particles are of the nature of gels they are subject to synerisis and this tendency to shrink is apparently increased when they are disturbed as they are in being carried around in my process. Whatever may be true in such respects, by the circulation I am about to describe, more rapid clarification and a denser sludge may be had.

I have in mind also a further object and result in that in the circulation I propose part of the liquid in the apparatus and part in the sludge is kept in an aerobic condition which tends to prevent the development of a putrescent condition and which may have some advantageous effect in promoting the clarification and thickening process.

With such and other objects in mind, my invention comprises both the process as heretofore referred to and as will be brought out in the following description, and also apparatus for carrying out the process. One desirable form of apparatus for carrying out my process is shown, for purposes of exemplification, in the drawing which represents a vertical cross-sectional view of such an apparatus.

The apparatus comprises a basin 1, that may be of any suitable size and construction, and similar in construction to the clarifiers, or sedimentation basins of the sewage treating art. Such clarifiers may be of any suitable shape, and generally include vertical side walls 2, and a floor 3, which preferably is inclined somewhat toward the center, as shown. Adjacent the center of the bottom is shown a sump 4 from which leads a discharge pipe 5 provided with a valve 6 for the removal of sludge. Adjacent the top of the basin is launder 7 from which leads the effluent pipe 8 for the discharge of clarified water.

The tank is spanned by beams 10 from which depends an outer cylinder 11 open at top and bottom, the lower edge being a suitable distance below the water level in the tank so that the liquid escaping thereunder will become clarified in passing to the launder 7. In the center of this cylinder 11 is a tube or inner cylinder 12 adjustably supported from the beams 10 as by the rods 13 having at the upper end a thread and nut, generally indicated by 14. To the bottom of the inner cylinder 12 is attached a plate, or baffle 15 of diameter somewhat greater than that of the inner cylinder 12, plate 15, being spaced away from the bottom of the cylinder a distance to provide for the inflow of sludge into the cylinder. Preferably, the baffle 15 will be adjustably mounted, as by rods 16, also provided with a thread and nut 17 at the upper end thereof, so that the spacing between the plate or baffle 15 and the inner cylinder can be adjusted. The bottom 18 of the inner cylinder 12 is open and is placed at an intermediate level of the basin 1. The upper end 19 of the inner cylinder is also open and is placed below the liquid level in the tank, or basin, so that an upward flow of liquid through the inner cylinder can be readily maintained. The outer cylinder 11 is also open at both ends, the upper end 20 being above the liquid level of the basin so as to provide a wall which, at the surface of the liquid separates the flow coming from the inner cylinder 12 from the quiescent clarifying zone in the upper portion of the basin 1; and the lower end 21 being at a level substantially below the liquid surface, but above the level of the lower end 18 of the inner cylinder 12. This construction provides a mixing chamber with an inlet 18 at a lower intermediate level and an outlet 21 at a higher intermediate level. It is necessary that the outlet 21 be substantially below the liquid surface so that the upper portion of the liquid in the basin will be maintained in a quiescent condition in order that liquid rising therein may become clarified. It is also preferable that inlet 18 and outlet 21 be at different levels, with the outlet placed above the inlet, for reasons which will become apparent later.

Adjacent the bottom 3 of the basin 1 is shown a scraping mechanism 25 of common form, this being carried on a shaft 26 and driven by a motor 27 equipped with a speed reducer 28, the scraping mechanism and drive being carried by the beams 10 in any suitable manner. Also driven by the motor 27 and reducer 28 is a quill shaft 29 which extends into the inner cylinder 12 and has a pump, or propeller 30, rigidly secured thereto. The two shafts 26 and 29 are necessary as it is well known that the scraping mechanism 25 must be driven very slowly, while it is desirable that a substantial flow of liquid be pumped through the inner cylinder 12 so that it is desirable that the pump rotate quite rapidly. Sewage to be treated enters through the inlet pipe 35, discharging as at 36 into the inner cylinder 12, preferably at a point adjacent propeller 30.

Operation of the apparatus and practice of the process is as follows: Assuming the basin 1 to have been filled with sewage, the quill shaft 29 and propeller 30 are rotated to draw liquid in over plate 15 into inner cylinder 12, from which it will pass into the outer space enclosed by cylinder 11 and then downwardly. Raw sewage entering through the inlet pipe 35 will be introduced into the rising column of circulating liquid and become mixed therewith and the entrapping or entraining effect spoken of will occur. This liquid will pass outwardly from the lower end 21 of the outer cylinder 11, and being of a density approaching that of the sludge in the basin at the level of the baffle plate 15, will tend to level off across the basin as a layer of slurry, or as a suspension, and from this liquid a throughput quantity of clarified sewage, corresponding to the rate of inflow, will rise and escape through the launder 7. This distribution across the basin, which results because the discharge at the lower end 21 of the outer cylinder 11 is heavier than the more clarified liquid above, is advantageous in several respects, among them that it reduces or eliminates the tendency for short circuiting from the outlet 21 to the launder 7 that occurs to a greater or lesser extent in most cases. Part of the liquid passed down through the outer cylinder 11 will perhaps be drawn down directly to the bottom end of inner cylinder 12 and reenter, but since the liquid reaching the bottom of outer cylinder 11 and discharging out into the basin has been diluted with the raw sewage it will tend to be lighter than the suspension or thickening sludge below that point, and the tendency will be for a large portion, and perhaps most of the liquid emerging from the outlet 21 to spread across the tank to the level as referred to above. Due to the same cause, the liquid, or partially thickened sludge, from a lower level will be drawn in across plate 15 into the lower end 18 of cylinder 12. Thus, in general, the circulation due to the action of the propeller 30 is not confined to the space enclosed by the cylinders and the baffle plate 12, but, because of gravity effects, includes a depth or layer over the whole area of the tank between the level of the lower edge 21 of the outer cylinder 11 and the baffle plate 15, and in this whole volume the actions that result in clarification and thickening can, and do, take place.

It is to be noted also that since this whole volume of liquid within the zone of circulation, and it is a substantial portion of the contents of the clarifier, is repeatedly brought back up to the surface and exposed to atmosphere within the outer cylinder 11, a degree of aeration is maintained that is desirable for various reasons including that of tending to prevent or lessen septic conditions.

It is partly because of the use of the space within the basin in the zone between the levels of the lower end 21 of the outer cylinder 11 and plate 15 in the way described that the volume within the space indicated by the outer cylinder 11 and the baffle plate 15 may be made quite small, and thus the effective volume of the tank 1 is not materially reduced. Actually, due to the increased rapidity of clarification and the aid to thickening resulting from the described process, actual size of the basin 1 may be reduced.

As previously referred to, the inner cylinder 12 is adjustably supported on the beam 10, so that it can be raised and lowered and with it, or independently, the plate 15 moved up and down. The purpose of this adjustment is to provide some selection as to the level at which solids or sludge is drawn into the mixing zone from the space within the basin 1. It is not essential, although it may be desirable, that the cylinder 12 itself be adjustable, but the baffle plate 15 should be supported in some way so that it will be adjustable.

Solids collecting on the floor 3 of the tank 1 are scraped into the sump 4 for discharge by rotation of the scraper 25 by the motor 27 and this scraping and discharge can be continuous or periodic as is desired and as may be indicated in the particular case.

It will be observed that the process here described is something essentially different from the coagulation or flocculation of sewage or other turbid liquid as heretofore proposed. There is no reliance on the agitation that is characteristic of and essential to the flocculation process, instead reliance is placed upon mixing of the two flowing streams, to secure entrapment of the new sewage solids by the partially thickened sludge. The apparatus lacks the movable paddles that are also characteristic of and essential to the flocculation process, there being required only the propeller or other suitable pumping means for causing the circulation from the basin into and through the mixing space. As indicated above, I rely on sedimentation and my process can be efficiently practiced in an ordinary clarification basin. While I rely on the particular character of the partially thickened sludge, and mix it with raw sewage, the resulting mixture is subjected to quiescent sedimentation. The differences in specific gravity provide the selective return which my process requires.

Since the liquid levels within the cylinders are preferably the same as in the tank 1 little power is required for this purpose. It should be remembered, however, that while the agitation of the flocculation process is not required here, yet the particles or solids resulting from this method of treatment have, in addition to other desirable characteristics referred to, the additional characteristic of tending to be tough so that the velocity of flow used within the mixing space and the speed of the propeller 30 may be higher than the speeds used in flocculation processes. Thus, with my process the speed at which the impeller 30 is rotated is relatively unimportant. It should be at such a velocity as will provide the required flow of partially thickened sludge, but can be fast or slow as desired.

It will be apparent that the mixture of raw sewage and partially thickened sludge passed through the inner cylinder 12 and the outer cylinder 11 will begin to deposit as sludge immediately upon being removed from the positive circulation within the two cylinders. The depositing sludge will gradually become thicker until at the floor 3 of the tank, it will become quite thick for a sewage sludge. It will be obvious that the material brought into the inner cylinder 12, which will be above the level of the baffle plate 15, will contain solids which are in the process of depositing, but have not yet come to a state of rest. It is these settling solids that I refer to in the term "partially thickened sludge," which is used to denote a material in a state between that of a true slurry or suspension and completely sedimented solids. It is well known that solids depositing from sewage form a very voluminous and light sludge, and quite liquid, even in its most concentrated form, so that the difference between true, or thickened, sludge and partially thickened sludge and a suspension is one of degree. However, I desire to use solids in the intermediate state, i. e., partially thickened sludge. Depending upon conditions of operation, that is, upon the quantity of circulation in comparison to the throughput of sewage, the material returned to the inner cylinder 12, for mixing with raw sewage may be either a true suspension or a deposited sludge, but it is preferred to use the partially thickened sludge as above described.

The volume of recirculating partially thickened sludge should be at least equal to the volume of entering raw sewage, in order to provide a substantial quantity of recently aggregated solids for contact with the solids contained in the raw sewage. While there is no objection to a considerably larger circulation of partially thickened sludge, it need not be much in excess of this figure. It is obvious that any increase in the amount of circulation will increase the cost of power required. It is also desirable to avoid excessively turbulent pumping as it is found that such can reach a point at which it becomes destructive to the partially thickened sludge. It will be found that when the throughput of sewage is properly balanced with circulation through the cylinders comprising the mixing zone, that the sludge in the outer portion of the tank tends to stratify into varying degrees of thickening sludge. In the extreme upper part of the tank is clarified sewage; below that, adjacent the outlet 21, from the mixing zone, the emerging liquid will be a true suspension; below that, but still in the intermediate zone, we find the partially thickened sludge, while at the bottom will be found the fully thickened sludge which has come to rest upon the floor of the basin. I have found that, as indicated above, the return of the fully sedimented sludge is undesirable in several respects. However, the use of the partially thickened sludge avoids defects of the old sludge return process and aids materially in the processing of sewage solids for sedimentation. The baffle plate 15 is used to secure the return of the partially thickened sludge, but to prevent the return of the thickened or fully settled sludge. This baffle therefore, has two functions, (1) of fixing the lower level of withdrawal and (2) to prevent the disturbance and consequent resuspension of the fully thickened sludge.

I claim:

1. In a liquid treating apparatus comprising a tank, means for delivering liquid to be treated into said tank, an outlet for treated liquid from the upper portion of said tank, a solids outlet from the floor of said tank, and means for moving solids deposited on the floor of said tank toward said solids outlet, the combination which comprises a vertically extending wall structure in said tank forming therein a mixing chamber, said chamber having an inlet opening from and an outlet opening to the interior of said tank at intermediate levels therein, said outlet opening being at a level below the said treated liquid outlet and the inlet opening being at a level below that of said outlet opening, a horizontally extending baffle below the inlet opening to said mixing chamber and of greater diameter than said inlet opening, and a pumping device operable to cause flow through said mixing chamber from said inlet opening to said outlet opening, said means for delivering liquid to be treated into said tank being positioned to deliver liquid to said mixing chamber.

2. The apparatus of claim 1 wherein the elevation of the inlet opening to the mixing chamber is vertically adjustable.

3. The apparatus of claim 1 wherein the horizontally extending baffle is vertically adjustable.

4. A sewage clarifying apparatus comprising a tank, a clarified sewage outlet from the upper portion of said tank, a sludge outlet from the lower portion of said tank, means for moving sludge settling on the floor of the tank toward said sludge outlet, a vertical inner chamber in said tank, the upper end of which is below the level of said sewage outlet and the lower end of which is spaced above the bottom of said tank, an outer chamber surrounding said inner chamber, the upper end of which is above the level of said sewage outlet and the lower end of which is below the level of said sewage outlet and above the level of the lower end of said inner chamber, a pumping device in said inner chamber operable to cause flow therethrough and through said outer chamber, a horizontally extending baffle below and adjacent the lower end of said inner chamber, and a sewage inlet opening into the inner chamber.

5. In a liquid treating apparatus comprising a tank, an inlet into said tank, a treated liquid outlet from the upper portion of said tank, a solids outlet from the floor of said tank, and means for moving solids deposited on the floor of said tank toward said solids outlet, the combination which comprises a vertically extending partition means in said tank forming therein a mixing chamber, said mixing chamber being so located that the inlet for sewage to be clarified discharges thereinto, an outlet from said mixing chamber opening into said tank at a level below the level of said treated liquid outlet, an inlet into said mixing chamber from the interior of said tank located at a level below that of said mixing chamber outlet and a substantial distance above the solids outlet, a horizontally extending baffle intermediate said mixing chamber inlet and the solids outlet, and a pumping device operable to cause flow through said mixing chamber from said mixing chamber inlet to said mixing chamber outlet.

6. In the process of clarifying sewage which includes maintaining a large body of sewage undergoing clarification, said body of sewage having a zone of clarified liquid in its upper portion, a zone of thickened sludge in its lower portion and a zone of partially thickened sludge intermediate said first mentioned zones, withdrawing clarified sewage from the upper portion of the clarified liquid zone and removing deposited solids to waste from the lower portion of said zone of thickened sludge, the improvement which comprises mixing partially thickened sludge from said intermediate zone and sewage entering to be clarified in a partially confined mixing zone, and discharging the mixture from the mixing zone into an upper level of said zone of partially thickened sludge.

7. The process of clarifying sewage which comprises retaining sewage while undergoing treatment in a clarification zone, delivering sewage entering to be clarified to a partially confined mixing zone within said clarification zone, drawing into said mixing zone partially thickened sludge from a central elevation in said clarification zone, mixing said entering sewage and partially thickened sludge in said mixing zone, discharging the mixture from the mixing zone into said clarification zone at a level therein above said central elevation and substantially below the surface of the sewage in said clarification zone, withdrawing clarified sewage from the upper portion of the clarification zone and removing deposited solids to waste from the lower portion of the clarification zone.

8. In the process of clarifying sewage which includes maintaining a large body of sewage undergoing clarification, said body of sewage being comparatively clear at the top and of increasing solids density downwardly to the form of a thickened sludge at the bottom, withdrawing clarified sewage from the upper portion of the body of sewage and removing deposited solids to waste from the lower portion of the body of sewage, the improvement that comprises delivering sewage entering to be clarified into a relatively small and partially confined mixing zone within said body of sewage, withdrawing partially thickened sludge from an intermediate portion of said body of sewage spaced above the thickened sludge into said mixing zone, mixing entering sewage to be clarified and said partially thickened sludge in the said mixing zone, and discharging the mixture so formed into said body of sewage at an elevation above the elevation of said withdrawal of partially thickened sludge.

9. A process of sewage clarification which comprises maintaining a body of sewage in a quiescent zone, said body of sewage having a stratum of clarified liquid at the top and therebelow a stratum of sludge of increasing solids density downwardly including respectively light sludge, partially thickened sludge and finally thickened sludge at the bottom of said zone, passing sewage to be clarified into said quiescent zone, withdrawing clarified sewage liquid from the stratum of clarified liquid and removing thickened sludge from the bottom of said zone, characterized by the steps of mixing entering sewage to be clarified with partially thickened sludge taken from an intermediate elevation of said stratum of sludge spaced above the bottom thereof a distance greater than the depth of thickened sludge and discharging said mixture into said stratum of sludge at a higher elevation, whereby the settleability of solids in the sewage is improved.

10. In combination with the clarification of sewage wherein the sewage is passed through a sedimentation zone, clarified sewage is withdrawn from the top of said zone, and thickened sludge from the lower portion of said zone, the improvement which comprises continuously withdrawing a predetermined amount of partially thickened sludge from a selected intermediate level within said sedimentation zone spaced above the floor of said sedimentation zone a distance greater than the thickness of thickened sludge in the bottom of said sedimentation zone, mixing said withdrawn partially thickened sludge with the sewage entering to be clarified, and discharging the mixture into said sedimentation zone at a level below the top of said zone and above said selected level of withdrawal.

11. The process of claim 10 wherein the volume of partly thickened sludge withdrawn for mixing with said entering sewage to be clarified is of the order of at least equal to the volume of said entering sewage.

12. In the process of clarifying sewage wherein sewage to be clarified is passed into and through a sedimentation zone in which solids deposit to form a sludge of downwardly increasing density, thickened sludge is collected in the lower portion of said zone and removed to waste therefrom, and clarified sewage is withdrawn from the upper portion of said zone, the improved method of conditioning sewage solids for sedimentation which comprises mixing the incoming sewage to be clarified with partially thickened sludge from an intermediate level of said zone, agitating the mixture of incoming sewage and partially thickened sludge in a confined mixing zone, and discharging the agitated mixture into another intermediate section of the sedimentation zone.

WALTER H. GREEN.

REFERENCES CITED

The following references are of record in the file of this patent:

UNITED STATES PATENTS

| Number | Name | Date |
|---|---|---|
| 2,190,598 | Fischer | Feb. 13, 1940 |
| 2,245,588 | Hughes | June 17, 1941 |
| 2,296,437 | Green | Sept. 22, 1942 |
| 2,128,393 | Allen | Aug. 30, 1938 |
| 1,194,000 | Dobyns et al. | Aug. 8, 1916 |
| 2,127,314 | Spaulding | Aug. 16, 1938 |
| 1,646,913 | Jost | Oct. 25, 1927 |
| 1,789,320 | Overbury | Jan. 20, 1931 |
| 1,876,994 | Mann, Jr. | Sept. 13, 1932 |
| 1,160,200 | Robbins | Nov. 16, 1915 |
| 2,188,847 | Streander | Jan. 30, 1940 |
| 2,217,143 | Stevenson | Oct. 8, 1940 |
| 1,912,595 | Schlenz | June 6, 1933 |
| 2,029,702 | Buswell et al. | Feb. 4, 1936 |
| 2,270,869 | Ditto et al. | Jan. 27, 1942 |
| 2,337,507 | Thayer | Dec. 21, 1943 |
| 2,254,953 | Thomas | Sept. 2, 1941 |
| 2,128,569 | Velz | Aug. 30, 1938 |
| 2,276,300 | Green | Mar. 17, 1942 |
| 1,139,024 | Frank | May 11, 1915 |
| 1,867,824 | Hammerly | July 19, 1932 |
| 1,900,809 | Hammerly | Mar. 7, 1933 |

FOREIGN PATENTS

| Number | Country | Date |
|---|---|---|
| 167,504 | Great Britain | July 27, 1922 |